United States Patent [19]

Fries et al.

[11] Patent Number: 5,091,095

[45] Date of Patent: Feb. 25, 1992

[54] SYSTEM FOR CONTROLLING DRAIN SYSTEM TREATMENT USING TEMPERATURE AND LEVEL SENSING MEANS

[75] Inventors: Carl F. Fries, Phoenix; Mitchell M. Hazar; Yoram J. Fridman, both of Scottsdale, all of Ariz.

[73] Assignee: Focus Enterprises, Inc., Phoenix, Ariz.

[21] Appl. No.: 556,290

[22] Filed: Jul. 23, 1990

[51] Int. Cl.⁵ .................................................. C02F 1/00
[52] U.S. Cl. .................................. 210/742; 210/85;
210/104; 210/139; 210/143; 210/198.1;
210/744; 210/752; 222/54; 222/66; 417/12;
417/18
[58] Field of Search ........................ 210/85, 87–89,
210/104, 139, 143, 149, 198.1, 614, 632, 742,
752, 103, 744; 417/1, 18, 32, 36, 12; 222/54, 66

[56] References Cited

U.S. PATENT DOCUMENTS

| 4,113,617 | 9/1978 | Bereskin et al. | 210/742 |
| 4,539,109 | 9/1985 | Davis | 210/149 |
| 4,676,403 | 6/1987 | Goudy et al. | 222/54 |
| 4,797,208 | 1/1989 | Miller et al. | 210/89 |
| 4,830,757 | 5/1989 | Lynch et al. | 210/143 |
| 4,897,797 | 1/1990 | Free et al. | 417/18 |
| 4,913,625 | 4/1990 | Gerlowski | 417/32 |
| 4,940,539 | 7/1990 | Weber | 210/149 |

FOREIGN PATENT DOCUMENTS

| 147795 | 8/1952 | Australia | 222/66 |
| 1095940 | 6/1984 | U.S.S.R. | 210/143 |

Primary Examiner—Robert A. Dawson
Assistant Examiner—Joseph Drodge
Attorney, Agent, or Firm—Joseph H. Roediger

[57] ABSTRACT

Automatic treatment of a drain system is provided by the controlled injection of a bio-active liquid at established intervals into the drain system. A container of the treatment liquid is provided with a pump coupled between the container and the drain. Fluid level sensing means is located in the container and fluid temperature sensing means is located in the drain system. When the temperature is within range and the fluid level is sensed, the pump is periodically operated to inject a quantity of fluid directly into the drain system without operator control.

6 Claims, 2 Drawing Sheets

SYSTEM FOR CONTROLLING DRAIN SYSTEM TREATMENT USING TEMPERATURE AND LEVEL SENSING MEANS

BACKGROUND OF THE INVENTION

This invention relates to the treatment of waste water drain systems and, in particular, to a system for the controlled injection of bioactive liquids to reduce the accumulation of fats and grease which otherwise would reduce flow in the system and ultimately cause a stoppage.

The problem of drain closure and reduced carrying capacity is recognized by all homeowners. The matter is generally handled by the use of commercial dissolving agents whenever the situation becomes severe enough to require immediate action. Typically this means that a stoppage has taken place. The average homeowner takes no preventive action to insure that buildup does not occur within his drain system and reacts only to the condition when it occurs. However, the operator of a commercial establishment which processes or prepares large quantities of food cannot afford to merely react to a condition when it occurs, but rather is required to take preventive measures so that no interruption of food-handling operations occurs. In addition, the large volumes of clogging agents entering into a commercial drain system can result in health and safety hazards arising if steps are not taken on a regular basis to ensure adequate and continuous flow of waste materials.

The advent of bioactive liquid cultures and their commercialization has now given the operator of a commercial establishment an effective agent for substantially reducing clogging problems due to accumulations of grease in his drain system. The use of these liquid agents has markedly reduced the need for physically removing buildup within drain systems. One method for automatically flushing and injecting bioactive agents in a waste system is described in U.S. Pat. No. 4,797,208 wherein periodic flushing and injection utilizes a plurality of solenoid valves and extensive logic circuitry to control the valves. While this method is found satisfactory in providing the desired result, the cost of the devices required to practice the method is not acceptable to the user. Alternatively, a combination of manual injection of the bio-active liquid and physical treatment of the drain system is frequently employed.

The use of employees or specialized service companies to provide the needed draining cleaning operations is time consuming, expensive and has the capability of disrupting normal business operations. This is especially the case when the cleaning function has not been performed on a timely basis and/or unplanned increases in usage occur within a short period of time. Consequently, a present need exists for an effective automatic system which injects bioactive liquid media into the drain system on a controlled basis without requiring complex valving or extensive control circuitry.

Accordingly, the present invention is directed to the provision of a drain treatment system which can be readily attached to the storage container for bioactive treatment fluid and is operative to regularly inject fluid into the drain system. The invention enables the treatment to take place during low use hours and without requiring the presence of an operator. In addition, the present invention provides a system which enables the amount of bioactive liquid and the periodicity of the injection thereof to be readily adjustable so as to compensate for changes in usage at the site. Also, the need for valving to interconnect with the water supply is obviated.

SUMMARY OF THE INVENTION

The present invention is concerned with apparatus for controlling the treatment of a drain system wherein treatment fluid from a reservoir is injected directly into the drain system in a controlled manner. The apparatus includes pump means coupled directly between the fluid reservoir and the drain system for providing the treatment fluid to the drain system when the pump is activated. In addition, a fluid sensing means is provided to inhibit the activation of the pump means when the fluid level in the treatment fluid reservoir falls below a predetermined level. A discharge control capability is provided by controlling the time of operation of the pump to regulate the amount of fluid injected into the drain system during activation. A first timing means is provided to establish the non-operating interval of the pump. The pump is rendered inoperative by this timing means until the next time for injecting treatment fluid into the drain system occurs.

A temperature sensing means may be located in the drain system and coupled to the pump means for inhibiting the activation of the pump means when the temperature of fluid in the discharge system is outside a predetermined range. The temperature sensing means can be utilized to insure that the environment within the drain system is not such as to render the injected bioactive fluid non-operative. Typically, bioactive treatment fluids have stated temperature ranges outside of which the beneficial effect of the active medium will not be experienced.

The pump is housed to be received upon the top surface of the container of bioactive treatment fluid. A communicating tube is inserted from the pump into the container. In addition, a fluid sensing means is also inserted into the container to indicate when the level of treatment fluid therein is below a certain level. The output line of the pump is directly connected to an input port opened in the drain system so that activation of the pump delivers treatment fluid directly into the drain system. Control circuitry is provided to establish the periodicity of treatment and also to control the amount of fluid delivered during each occurrence of fluid injection.

Further features and advantages of the invention will become more readily apparent from the following detailed description of a specific embodiment when viewed in conjunction with the accompanying drawing.

DESCRIPTION OF THE PREFERRED EMBODIMENT

Figure 1:
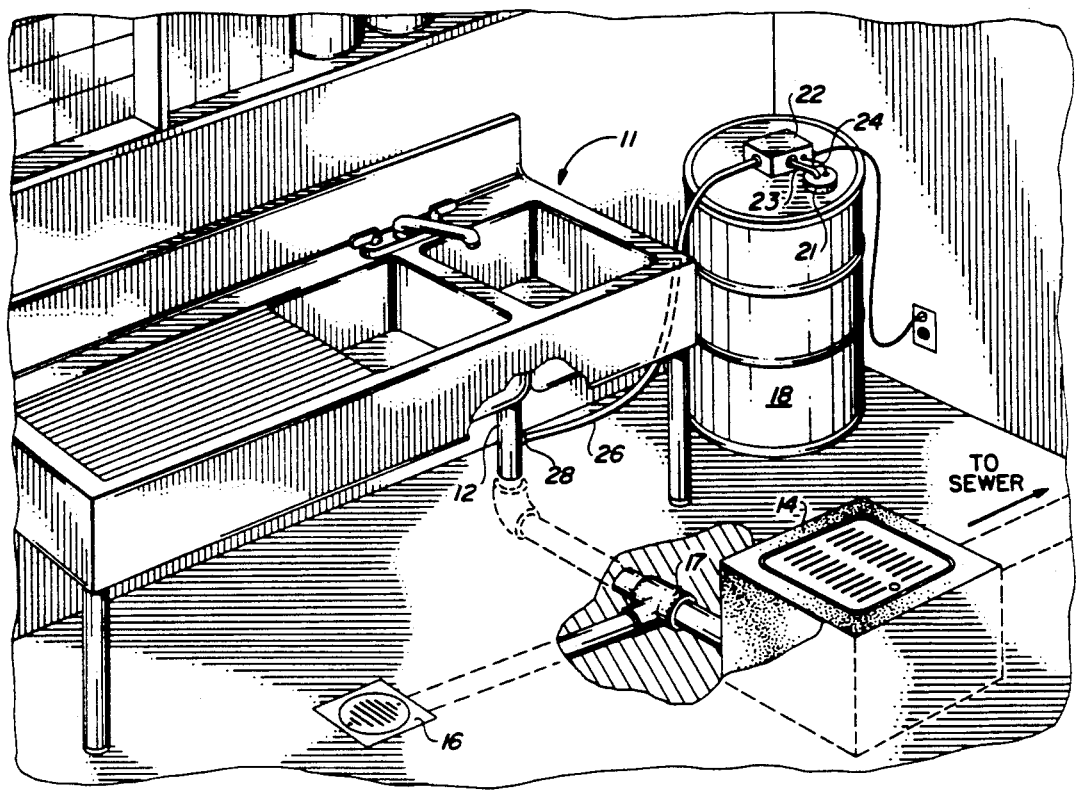
FIG. 1 is a view in perspective showing the inter-connection of the present invention with a drain system.

Referring now to FIG. 1, a typical commercial sink 11 is shown having a downwardly extending drain pipe 12 which connects to a grease trap 14 which in turn is connected through suitable piping to a sewer system. A floor drain 16 is shown connected at tee 17 to the drain system prior to the grease trap.

A container 18 of bioactive liquid treatment fluid is shown situated adjacent sink 11. The bioactive liquid is a commercially available formulation containing cultures which liquefy and digest the typical contaminants entering a grease trap and drain system. One such product found particularly well-suited for use in connection with the present invention is made by Sybron Chemicals, Inc. of Burmingham, N.J. and is marketed as the BI-CHEM TO-5001 formulation. Other types of bioactive products providing the same type of fat and grease removal can be used as desired. Bioactive liquid formulations are normally sold in container such as shown in FIG. 1, and may be as large as the standard 55 gallon drum. It is a characteristic of such containers that a bung is provided on the top surface. In the case of the present invention, a stopper 21 containing two holes is placed therein. A pump is contained in housing 22 which communicates through flexible tube 23 through one hole in stopper 21 to the interior of the container 18. Also, a wire pair 24 from the housing enters the container 18 through the other hole in the stopper and extends downwardly as shown. The power source for the pump in housing 22 is provided by a wall socket and is standard 60 cycle current.

A flexible delivery tube 26 is connected between the pump in housing 22 and an input port 28 formed in drainpipe 12. As shown, a watertight bushing is provided at the input port 28 to eliminate leakage. The energization of the pump resolves in the transport of the bioactive treatment fluid from within container 18 directly into the drainpipe 12. The input port is preferably located above the plane of the waste gathering system to ensure that fluid is injected into the system behind any accumulation points therein. The grease trap 14 located downstream between the waste transport system and the main sewer connection is typically provided with a removable cover to permit access from the floor of the building. This has permitted an employee to access the drain system and manually remove grease accumulations. This prior practice is only partly effective since it fails to remove accumulations in the waste system located upstream. These accumulations have been typically dealt with by rotors or other mechanical treatment devices inserted in the drain system which churn through the accumulations so that the buildup can be flushed into the sewer system.

Figure 2:
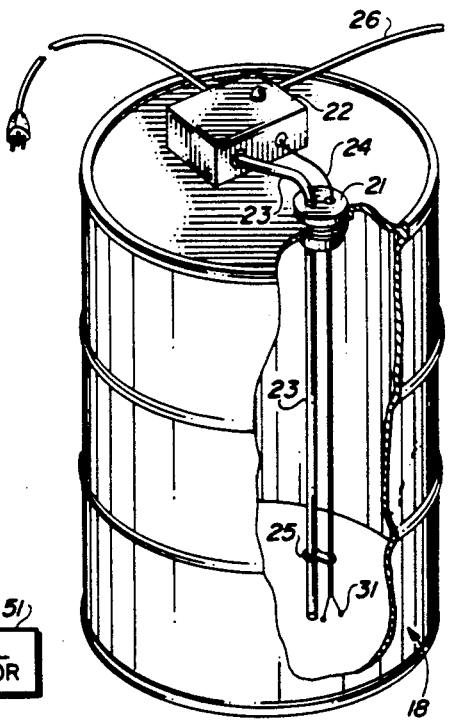
FIG. 2 is a view in partial section of a treatment fluid container adapted for use in the embodiment of FIG. 1.

In FIG. 2, the bioactive liquid container 18 is shown in partial section with pump housing 22 positioned on its top surface and spaces adjacent from the stopper 21. In this embodiment of the invention, the pump housing is dimensioned to be 4×4×2 inches and therefore is readily accommodated on most containers. The stopper 21 is provided with two holes, one of which receives tubing 23 and the other of which receives wire pair 24. Spacers 25 are provided to establish the relative positions and to locate the end of the tubing and the end of the wire pair near the bottom of the container. As shown, the ends 31 of the wire pair do not extend downwardly as far as the end o tubing 23. The spaced ends of the wire pair constitute a fluid level sensor used to indicate when the container should be replaced. The sensor relies on the conductivity of the fluid between the wire ends 31 to complete an electrical circuit which when complete does not inhibit the operation of the pump. When the liquid is below the level of the wire ends 31, the conductivity is reduced as a result of the air gap therebetween. Thus, the electrical circuit is in effect opened to indicate a low fluid level. In practice, the spacer which maintains the relative positions of the tubing 23 and the wire pair 24 is a short length of wire wrapped twice around the tubing and once around the wire pair. The spacers are provided after the tubing and wire have been inserted through the stopper 21 and prior to the insertion of the assemblage into the container 18.

Figure 3:
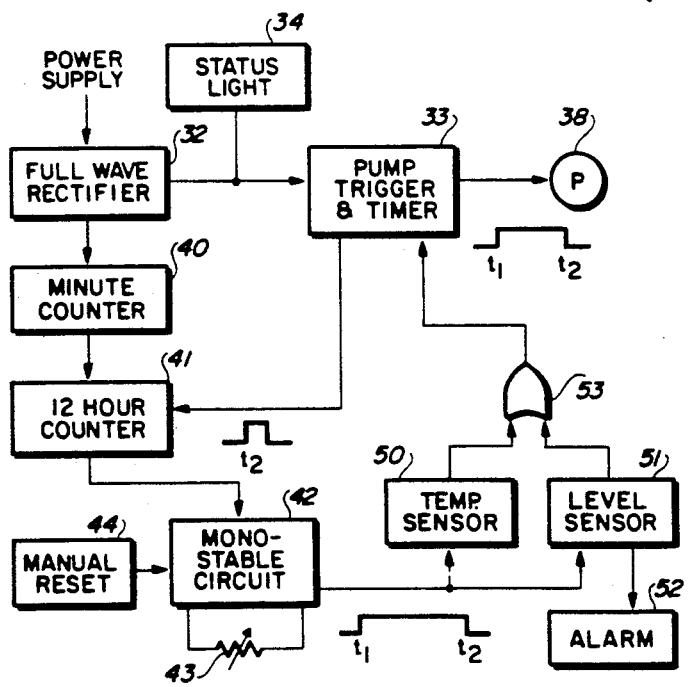
FIG. 3 is a block schematic diagram showing the electrical circuit of the embodiment of FIG. 1.

The operation of the pump in housing 22 is described in connection with the block schematic diagram in FIG. 3. As mentioned, the power supply is the standard 60 cycle signal, reduced in voltage and supplied to a full wave rectifier 32. The output signal from the rectifier 32 is a series of single polarity pulses which are supplied to the pump trigger and timer circuit 33 and to the status light 34. The status light is shown located on the top of the housing 22 in FIG. 2 and serves to indicate when the system is operational. Before the pump trigger is enabled to place the pump 38 in operation, timing and sensing operations are performed.

The 60 cycle pulses are supplied to a minute counter 40 which provides an output signal after receiving 60 input pulses. The output signal of the minute counter is supplied to a 12 hour counter 41 which receives 720 input signals for each output signal generated. The output signal from the 12 hour counter 41 is supplied to a monostable circuit 42 which, when triggered from its stable condition, provides a signal until the circuit reverts to its stable condition or state. Circuits of this type are well known and rely on the product of resistors and capacitors to determine the duration of the output signal. An adjustable resistor 43 is shown connected to the monostable circuit block to indicate that the duration of the output signal is adjustable by the operator. Also, a manual reset 44 is provided to permit independent triggering of the monostable circuit and the initiation of an output signal therefrom at the control of the operator. Thus, either a signal from the 12 hour counter 41 or an operator generated reset signal from the manual reset 44 will cause with monostable circuit to provide an output signal, the duration of which is determined by adjustment of resistor 43. This pulse signal is shown in FIG. 3 as commencing at time T1 and terminating at time T2.

The pulse output signal of the monostable circuit 42 is provided to temperature sensor 50 and level sensor 51. The level sensor discussed in connection with FIG. 2 will appear as an open circuit if the fluid within container 18 does not cover the exposed wire ends 31. The open circuit condition of the level sensor will also trigger an audible alarm 52 to alert the user that a new container of fluid must be prepared for use. A temperature sensor 50 is preferably employed with the installation and is connected to a temperature sensor located within the drainpipe 12. The determination that the temperature within the drainpipe 12 is outside a predetermined temperature range will appear as an open circuit at sensor 50. In the case where both the temperature sensor and the level sensor are utilized, the outputs are taken to a gate 53 and the open circuit condition in either sensor will prevent a signal from being supplied to the pump trigger and timer circuit 33. If both conditions are satisfied and the sensors appear as closed circuits, the trigger circuit 33 is conditioned to provide DC power to pump 38 in the form of a pulse. The pulse, as shown in FIG. 3, has a duration T1 T2 that is determined by the monostable circuit 42. At time T2, the monostable circuit 42 returns to its stable condition and its output signal terminates. The pump trigger signal also terminates at time T2. In addition, a timer signal is supplied by circuit 33 to reset the 12 hour counter so that the next operating cycle is initiated.

When the pump is energized, the bioactive fluid from container 18 is supplied through the tubing into the drain 12. The amount of fluid supplied is a direct function of the time that pump 38 is energized, i.e. the interval T1—T2. As previously noted, this is controlled by the adjustment of resistor 43 of the monostable circuit 42. At any time that an additional treatment is felt to be necessary perhaps because of an unexpected increase in flow of waste liquids through the drain, the manual reset 44 can be used to trigger the monostable circuit and initiate pump action. The use of the manual reset will result in the 12 hour counter being automatically reset to begin counting as if the cycle had just been initiated. While minute and 12 hour counters are utilized in the preferred embodiment shown in FIG. 3, it is to be recognized that different combinations of counters can be utilized as desired to effect different nominal treatment cycles.

Figure 4:
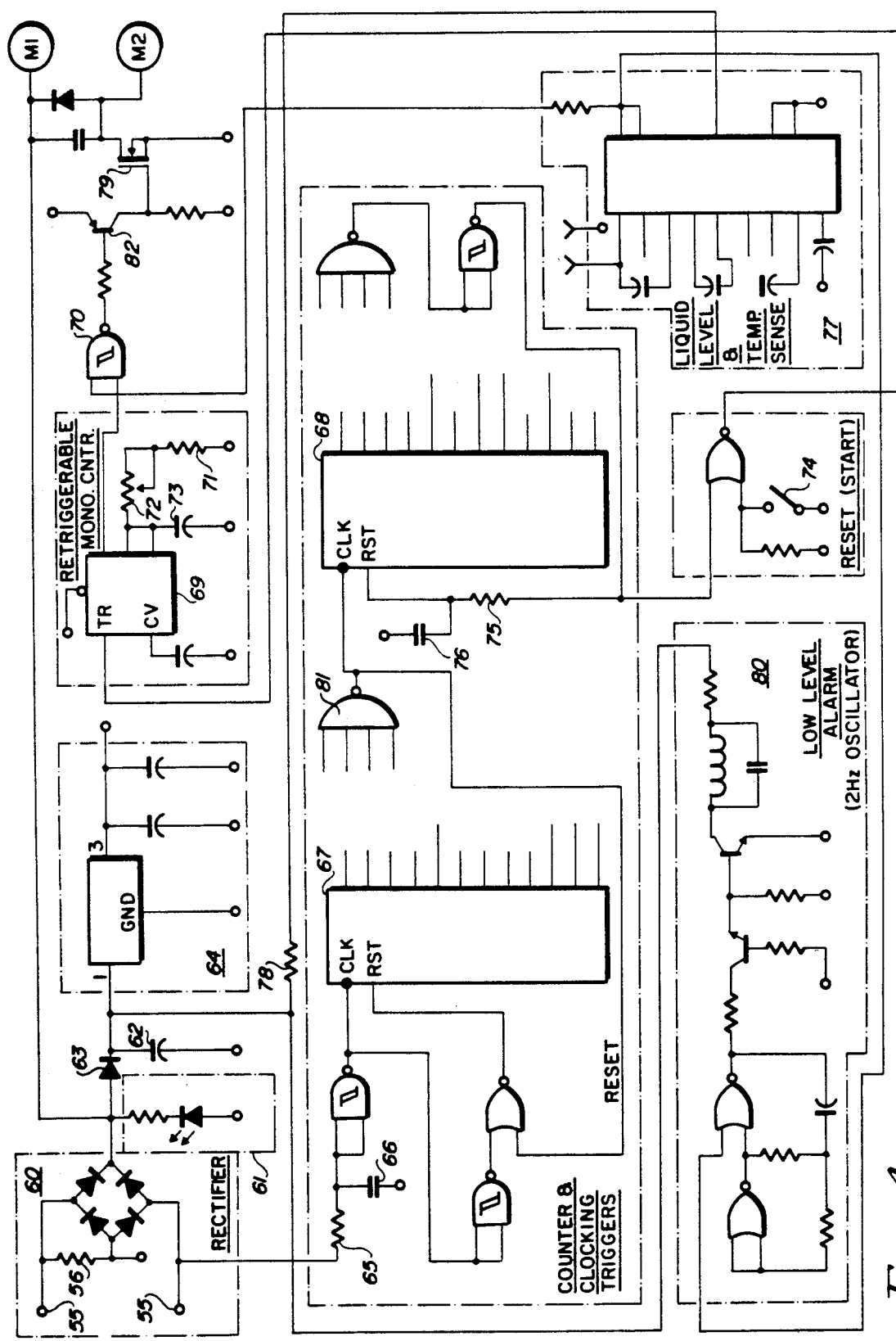
FIG. 4 is an electrical schematic diagram of one embodiment of the invention.

An electrical schematic diagram of one embodiment of the invention tested and operated successfully is shown in FIG. 4 wherein the AC power between terminals 55 is rectified by the bridge in rectifier circuit 60. Resistor 56 is coupled between one input terminal and the bridge terminal to establish a common reference for the 60 cycle clock signal used in the system counters. The combination of a resistor and light emitting diode constitutes the status light 61 to indicate that the system is in operation. The rectified signal is passed through diode 63 and filtered by capacitor 62. In addition, the capacitor also provides a few second hold time when the power is turned off and the circuit is rendered inactive. The operating voltage for the system components is provided by a 5 volt regulator circuit 64 with two filter capacitors connected at its output terminal.

When the AC power is applied to the circuit, a 60 cycle signal is supplied to the resistance-capacitance network of resistor 65 and capacitor 66 and comprises the input signal to a Schmidt trigger circuit 81 utilized as the minute counter. The output of the nand circuit 67 is supplied to the 12 hour counter 68. When it reaches a count of 720 it provides a signal to the retriggerable monostable counter 69 which then provides an output signal to nand gate 70. Resistors 71 and 72 and capacitor 73 establish the variable duration for the output signal of the monostable counter signal 69, shown as pulse T1—T2 of FIG. 3. The adjustment of resistor 72 provides a variable time for the output signal and for the pump operation.

The reset function is provided by switch 74 so that the user can initiate pump operation at any time. In addition, the 12 hour counter is coupled to resistor 75 and capacitor 76 which serve to reset the 12 hour counter when the circuit is activated and also to provide a time delay for subsequent resetting of the 12 hour clock.

At the time that the nand circuit 70 receives an input signal from the monostable counter, the base of PNP transistor 82 is taken low only when the output of the liquid level and temperature sensing circuits 77 indicate fluid in the container and the temperature within the drainpipe is appropriate for operation. Power to the sensing circuit 77 is supplied through current limiting resistor 78. The presence of both signals at nand circuit 70 drives transistor 76 into conduction which provides drive to the field effect transistor 79 resulting in the completion of the pump circuit.

The liquid level and temperature sensing circuit 77 is used in the preferred embodiment shown to drive an audible alarm circuit 80 which contains a 2 HZ oscillator and speaker. The sensing of a low fluid level within the container turns off the power to the pump and it also turns on the alarm circuit thereby signaling the user that the fluid level is low.

In the embodiment shown and described in connection with FIG. 4, the nand circuits are type 74 HC 132, the nor circuits are type 74 HC 02, the monostable counter is a LM 555 circuit, and the one minute and 12 hour counters are 74 HC 4040 circuits. The processing circuit for the liquid level and temperature sensing probes is a ULN 2429A circuit and the five volt regulator is a LM 78 L05 circuit. The particular counter circuits can be modified for combinations other than one minute and 12 hour counting in accordance with the particular needs of the user. The foregoing circuit components have been found well
suited in the embodiments tested and operated, but it is to be noted that different circuits can be utilized to provide equivalent functions.

While the foregoing description has referred to specific embodiments of the invention, it is recognized that many modifications and variations may be made therein without departing from the scope of the invention as claimed.

What is claimed is:

1. A method for controlling the treatment of a drain system of the type wherein a treatment fluid is injected by pump from a reservoir into a drain system which comprises the following steps:
    (a) establishing a periodic operating cycle for the pumping of treatment fluid from the reservoir;
    (b) sensing the temperature within the drain system to determine if it is within a predetermined range;
    (c) sensing the presence of treatment fluid in the reservoir to determine if it is below a predetermined level;
    (d) inhibiting the injection of treatment fluid if the temperature sensed is outside the predetermined range or the fluid is below the predetermined level in the reservoir; and
    (e) reestablishing the operating cycle for the pumping of treatment fluid when said temperature is within the range and said fluid is present at or above the predetermined level.

2. Apparatus for treating a drain system for discharge fluid by the injection of treatment fluid from a supply container, said apparatus comprising:
    (a) pump means coupled between a system containing fluid to be treated and a supply container for injecting treatment fluid from said supply container into the system when activated, said pump means having non-operating intervals;
    (b) fluid sensing means located within the supply container for providing a first output signal when the level of treatment fluid in said container is below a predetermined level and temperature sensing means for determining a temperature of said fluid within the system and for providing a second output signal when the temperature is outside a predetermined range;
(c) means for coupling the output signals to the pump means to initiate said nonoperating intervals;
(d) first timing means for establishing the non-operating interval for said pump means; and
(e) control means for activating the pump means and controlling amounts of treatment fluid injected into said between said nonoperating intervals system.

3. Apparatus in accordance with claim 2 wherein said temperature sensing means is effective to inhibit inhibits activation of said pump means whenever the temperature of fluid being treated is outside the range.

4. Apparatus in accordance with claim 3 further comprising indicating means for determining when the fluid level sensing means or temperature sensing means have inhibited activation of the pump means and displaying a signal indicating same.

5. Apparatus in accordance with claim 4 wherein said discharge control means is adjustable to thereby permit the amounts of treatment fluid injected to be controlled.

6. Apparatus in accordance with claim 5 wherein said temperature sensing means includes a sensing element located in the system.

* * * * *

UNITED STATES PATENT AND TRADEMARK OFFICE
CERTIFICATE OF CORRECTION

PATENT NO. : 5,091,095
DATED : 2/25/92
INVENTOR(S) : Carl Fries, Mitchell Hazar and Yoram Fridman It is certified that error appears in the above-identified patent and that said Letters Patent is hereby corrected as shown below:

Column 7:

Claim 2(d) line 8 should read:

ing intervals for said pump means; and

Column 7:

Claim 2 (e) line 11 should read:

said system between said nonoperating intervals.

Signed and Sealed this

Sixth Day of July, 1993

Attest:

MICHAEL K. KIRK

Attesting Officer     Acting Commissioner of Patents and Trademarks